United States Patent
Ebeling et al.

(10) Patent No.: US 7,614,291 B2
(45) Date of Patent: Nov. 10, 2009

(54) TEST BED AND METHOD FOR AERODYNAMIC MEASUREMENTS ON AN OBJECT

(75) Inventors: Welf Ebeling, Munich (DE); Karlheinz Ebbinghaus, Munich (DE); Edzard Mercker, Munich (DE); Oliver Meyer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/036,672

(22) Filed: Feb. 25, 2008

(65) Prior Publication Data

US 2008/0202227 A1   Aug. 28, 2008

Related U.S. Application Data

(63) Continuation of application No. PCT/EP2006/008002, filed on Aug. 12, 2006.

(30) Foreign Application Priority Data

Aug. 26, 2005   (DE) ........................ 10 2005 040 445

(51) Int. Cl.
*G01M 17/00* (2006.01)
(52) U.S. Cl. .................................................. 73/116.07
(58) Field of Classification Search ............. 73/115.01, 73/116.01, 116.06, 116.07, 116.08, 116.09, 73/116.11, 117.01, 118.01, 147
See application file for complete search history.

(56) References Cited

U.S. PATENT DOCUMENTS

| | | | |
|---|---|---|---|
| 4,494,022 A | 1/1985 | Kawara et al. | |
| 6,518,680 B2 * | 2/2003 | McDavid, Jr. | 290/54 |
| 6,710,469 B2 * | 3/2004 | McDavid, Jr. | 290/55 |
| 7,032,861 B2 * | 4/2006 | Sanders et al. | 244/23 A |
| 7,249,732 B2 * | 7/2007 | Sanders et al. | 244/23 A |
| 2003/0066361 A1 | 4/2003 | Kim et al. | |
| 2006/0237237 A1 | 10/2006 | Kerschbaum et al. | |

FOREIGN PATENT DOCUMENTS

| | | |
|---|---|---|
| DE | 652 779 A | 11/1937 |
| DE | 32 24 941 C1 | 1/1984 |
| DE | 103 38 638 A1 | 3/2005 |

(Continued)

OTHER PUBLICATIONS

Jung-Hua Yang et al., "Adaptive Sliding-Mode Based Voltage-controlled Active Magnetic Bearing System", IEEE, US, vol. 3 of 3, Conf. 29, Nov. 2, 2003, pp. 1950-1955, XP010691264 ISBN: 0-7803-7906-3, whole document.

(Continued)

*Primary Examiner*—Eric S McCall
(74) *Attorney, Agent, or Firm*—Crowell & Moring LLP

(57) ABSTRACT

A test bed and method for performing aerodynamic measurements on an object, in particular, a vehicle, are provided, in which a weighing plate serves to support the weight of the object. The weighing plate is mounted on a bearing device relative to a stationary environment. The bearing device is formed with at least one magnetic bearing.

15 Claims, 1 Drawing Sheet

FOREIGN PATENT DOCUMENTS

| | | |
|---|---|---|
| EP | 0 421 029 A1 | 4/1991 |
| JP | 64-74006 A | 3/1989 |
| JP | 2002-71532 A | 3/2002 |
| JP | 2005-3621 A | 1/2005 |
| WO | WO2005/022108 A1 * | 3/2005 |

OTHER PUBLICATIONS

International Search Report dated Nov. 7, 2006 w/English translation (six (6) pages), PCT/EP2006/008002.
German Search Report dated Apr. 12, 2006 w/English translation of pertinent portion (nine (9) pages), 10 2005 040 445.6.

* cited by examiner

TEST BED AND METHOD FOR AERODYNAMIC MEASUREMENTS ON AN OBJECT

CROSS-REFERENCE TO RELATED APPLICATIONS

This application is a continuation of PCT International Application No. PCT/EP2006/008002, filed on Aug. 12, 2006, which claims priority under 35 U.S.C. § 119 to German Application No. 10 2005 040 445.6, filed Aug. 26, 2005, the entire disclosures of which are expressly incorporated by reference herein.

BACKGROUND AND SUMMARY OF THE INVENTION

The invention relates to a test bed for aerodynamic measurements on an object, in particular, a vehicle. In this case, such a test bed is also called a wind tunnel scale, which is provided with a weighing plate. The weighing plate serves to support the weight of the object and is mounted on a bearing device relative to a stationary environment. Furthermore, the invention relates to a method for measuring aerodynamic forces acting on an object, in particular a vehicle.

German patent document DE 103 38 638 A1 discloses a test bed for carrying out aerodynamic measurements. This test bed is formed with at least one contact surface for detecting the weight of a vehicle, and a running belt for simulating a roadway. In addition, the running belt is arranged in its entirety on a weighing plate. The weighing plate is mounted on a hydrostatic bearing device relative to a stationary environment. As an alternative, air bearings may also be used. At least one measuring device in the form of several weighing cells determines the forces acting upon the vehicle based on the movement tendency of the weighing plate relative to the stationary environment.

Of course, such a test bed and a dedicated measurement method make possible a comparatively accurate measurement of the aerodynamic forces acting on the vehicle. Yet, they still produce inaccuracies that one would like to avoid as much as possible.

The object of the invention is to provide a test bed and a method for carrying out aerodynamic measurements on a vehicle. With this method, higher measurement accuracy can be achieved.

According to the invention, a test bed and method are provided for aerodynamic measurements on an object, in particular, a vehicle. The test bed includes a weighing plate, which serves to support the weight of the object and which is mounted on a bearing device relative to a stationary environment. The bearing device is formed with at least one magnetic bearing. The inventive method provides that the object is supported on the weighing plate of the test bed and that the weighing plate is mounted by way of at least one magnetic bearing. Advantageous further developments are described and claimed herein.

The invention achieves the desired target of higher measurement accuracy by improving the bearing device of a weighing plate of a wind tunnel scale. The magnetic bearings (or rather the magnetic bearing devices) provide that there is absolutely no friction at the bearings of the weighing plate. There are, according to the invention, for example, at least three magnetic bearings between a stationary base frame and a scale frame. Furthermore, with the inventive magnetic bearings, the engineering effort to implement and operate such a test bed can be minimized altogether. Thus, for example, there is no need to either lubricate and/or cool the bearings. Even the maintenance work for the inventive magnetic bearings is comparatively low, since they work in a contactless matter. Finally, the invention also eliminates the problem of limited functional reliability, which is the case to some extent with the existing test beds.

In an advantageous further development of the invention, the at least one magnetic bearing is formed with at least one magnetic coil and a current source, with which electric current can be sent through the magnetic coil. In other words, in this further development, the bearing device of the weighing plate is formed by use of at least one electromagnetic and/or active magnetic bearing, which represents, in particular, an electromechanical energy converter. Such an active magnetic bearing is provided with not just permanent magnets, but also exhibits at least one magnetic coil, by which a magnetic field can be generated by choice. The magnetic forces of the magnetic field of the coil can be influenced by a change in the electric current, sent out by a current source through the magnetic coil, in particular, by a change in the current intensity of this electric current. The result is the possibility of influencing specific bearing properties of the inventive bearing.

Furthermore, the inventive test bed provides, preferably, an evaluating device, with which a change in the electric current, flowing through the magnetic coil, is determined and can be converted into information about a change in the forces acting on the weighing plate. A change in the current flowing through the magnetic coil can be caused, in particular, by a (negligible) change in the position of the weighing plate in relation to a stationary environment. Such an improved active magnetic bearing subsumes in its function both a totally frictionless bearing device as well as a measuring device for forces acting on the weighing plate and, thus, for the aerodynamic forces acting on the object.

Owing to the change in the electric current in the at least one magnetic coil of the inventive bearing device, there is a change in the magnetic field and, thus, the effect of the force on the part to be mounted. Inversely, each change in the forces acting from the outside on the magnetic bearing results in a change in position and/or at least a tendency towards a position change. In the magnetic bearing this position change results in changes in the electric current flow. In order to hold in position, as a function of the acting forces, the part to be mounted in an advantageous manner relative to the stationary environment of the test bed, the invention provides, therefore, advantageously a control unit, with which the electric current flowing through the magnetic coil can be changed as a function of the forces acting on the weighing plate. Thus, the result is a control unit (or rather a control circuit), with which when controlling the current as a type of drive, for example, an actuating path "s" and a control current "l" are mapped to a force F according to the following equation:

$$F:(l,s)| \rightarrow (k_s - k_m)s + k_l l + K_{12} l^2 s + k_{s2} s^2$$

where:
$k_l$ force current factor;
l control current;
s actuating path;
$k_m$ mechanical rigidity;
$k_{12}, k_{s2}$ coefficients, which consider non-linear effects; and
$k_s$ magnetic rigidity.

With a suitable design of the control electronics, the invention further develops or rather expands the control unit into a measuring device. In this function, the active magnetic bearing replaces both a conventional hydraulic bearing and conventional measuring devices of a weighing system.

This solution, which can be applied in principle to any wind tunnel scale having a weighing plate, is used, particularly, preferably for a test bed, in which a running belt is provided for simulating an environment of the object. In addition, the running belt is supported advantageously on the weighing plate; and the object itself in turn is supported (in particular, totally) on the running belt.

In particular, the system inherent property of the functional allocation F=f(s, l) (see above) of active magnetic bearings offers, according to the invention, the possibility of determining the aerodynamic forces by way of position and/or current measurement. Thus, it is possible to dispense with the normally necessary weighing cells, such as strain gauges or piezo elements, including the related time-consuming measuring techniques of the conventional bearing devices.

One embodiment of an inventive test bed for carrying out aerodynamic measurements on an object is explained in detail below with reference to the attached schematic drawings.

Other objects, advantages and novel features of the present invention will become apparent from the following detailed description when considered in conjunction with the accompanying drawings.

DETAILED DESCRIPTION OF THE DRAWINGS

Figure 1:
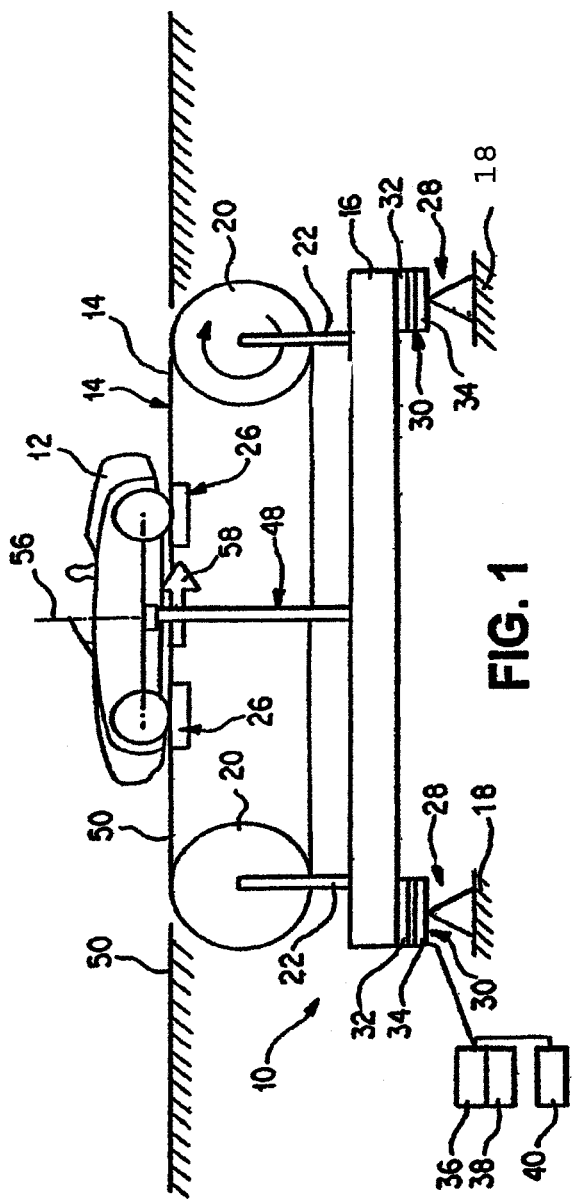
FIG. 1 is an extremely simplified lateral view of an embodiment of an inventive test bed for aerodynamic measurements.
Figure 2:
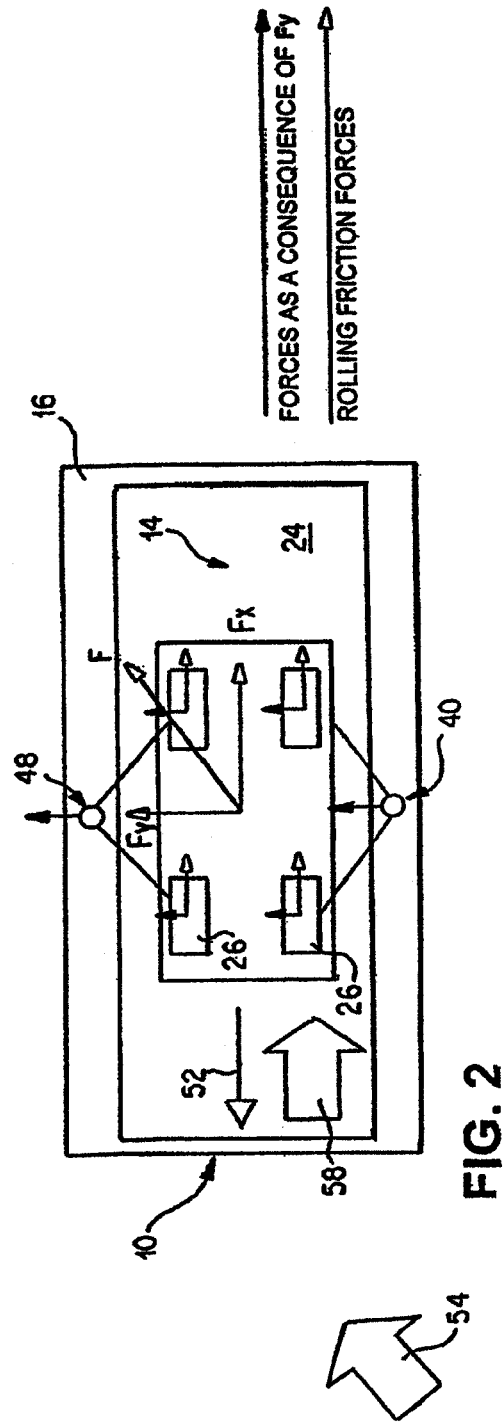
FIG. 2 is an extremely simplified top view of the test bed shown in FIG. 1.

FIGS. 1 and 2 illustrate a test bed 10 for carrying out aerodynamic measurements on an object in the shape of a vehicle 12. In this case, the test bed 10 includes a running belt 14 and a weighing plate 16, which is situated underneath the running belt 14. The weighing plate 16 is supported relative to a stationary environment 18.

The running belt 14 is supported by two rollers 20, which extend parallel to one another and are supported on roller supports 22, attached to the weighing plate 16. The rollers 20 are surrounded by a belt 24, by which a total of four contact surfaces 26 are formed for supporting the vehicle 12, which is placed on the running belt 14.

The weighing plate 16 is essentially rectangular and, at its corner areas, is supported by a total of four bearing devices 28, which are attached to the stationary environment 18.

The bearing devices 28 are each formed as an active magnetic bearing 30, which includes, on the one hand, at least one permanent magnet 32 mounted stationarily on the weighing plate 16 and, on the other hand, at least one magnetic coil 34 mounted stationarily in relation to the environment 18. Furthermore, a current source 36 is coupled to the magnetic coils 34 of the magnetic bearings 30. This current source sends current through the magnetic coil 34 in order to generate a magnetic field. The magnetic field results, together with the magnetic field of the associated permanent magnet 32, in the possibility of a frictionless displacement of the weighing plate 16 relative to the stationary environment 18 within certain limits at the individual magnetic bearing 30.

Furthermore, an evaluating device 38 is operatively coupled to the magnetic coils 34. A control circuit is produced by way of the evaluating device 38 together with the associated current source 36. The control circuit modifies the associated magnetic field and, thus, the effect of the force on the weighing plate 16 by changing the current flowing through the individual magnetic coils 34. Inversely, any change in the force acting from the outside on the magnetic bearing 30—for example, an aerodynamic force acting on the vehicle 12—results in a variation in the position and, thus, also a change in the current.

By evaluating the tendency of this current change via the evaluating device 38 and a corresponding current control by way of a control unit 40, assigned to the current source 36, the actuating path s and the control current l are mapped to the force F according to the aforementioned equation $$F:(l,s)| \to (k_s - k_m)s + k_l l + K_{12} l^2 s + k_{s2} s^2$$

In this way, a measuring device is created with which the aerodynamic forces acting on the vehicle 12 can be determined in a very simple manner during a test.

As mentioned above, a vehicle 12 which is to be measured is placed on the test bed 10 on the contact surfaces 26 of the running belt 14. Using a fixing device 48, the vehicle 12, which is placed in this manner, is fastened on a simulated roadway plane 50, so that it cannot move off the test bed 12.

Under the vehicle 12, the rollers 20 cause the belt 24 to revolve so that a driving direction 52 is simulated for the vehicle 12. By using a wind tunnel, which is not shown, wind (see wind direction arrow 54 in FIG. 2) can be simulated and applied to the vehicle 12 arranged on the test bed 10. The longitudinal and side forces (Fx and Fy), moments, and lift forces (Fz), acting on the vehicle 12 by the applied wind, are determined then during a test by way of the active magnetic bearings 30 (explained above), which act as the measuring device.

Therefore, a wind force F, according to the wind direction arrow 54, acts upon the vehicle 12 during a test. This wind force F can be divided into the two force components—longitudinal force Fx and side force Fy. The wind force components Fx and Fy result in a supporting force of the vehicle 12 on the fixing device 48. The forces are transmitted by way of the fixing device 48 to the weighing plate 16 and, from there, to the four magnet bearings 30. In this manner, the aerodynamic longitudinal and side forces on the vehicle 12 are measured with the magnetic bearings 30.

Whereas the top side of the belt 24 moves in a direction 58 opposite the driving direction 52, rolling friction forces act on the wheels of the vehicle 12. These rolling friction forces are compensated by the drive of the belt 24 and/or the rollers 20. Therefore, only the wind forces and/or the wind moments acting on the vehicle 12 are determined with the magnetic bearings 30, whereas the rolling friction forces of the vehicle 12 on the belt 24 are deflected over the fixing device 48 to the weighing plate 16 and do not go into the measurement of the aerodynamic forces and moments.

The lift forces Fz, which act on the vehicle 12 and are also caused, in particular, by the driving wind, are also determined by the magnetic bearings 30, which are explained above. In this case the magnetic bearings 30 determine the (local) "lift" or "hold down" of the vehicle based on the lift forces in parallel direction to the vertical axis 56 of the vehicle 12.

TABLE OF REFERENCE NUMERALS 10 test bed
12 vehicle
14 running belt
16 weighing plate
18 stationary environment 20 roller
22 roller support
24 belt
26 contact surface
28 bearing device
30 magnetic bearing
32 permanent magnet
34 magnetic coil
36 current source
38 evaluating device
40 control unit
48 fixing device
50 roadway plane
52 driving direction
54 wind direction
56 vertical axis
58 moving direction of the top side of the belt The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A test bed for performing aerodynamic measurements on an object, comprising:
    a weighing plate operatively configured to support a weight of the object;
    a bearing device on which the weighing plate is mounted relative to a stationary environment;
    wherein the bearing device comprises at least one magnetic bearing including at least one magnetic coil and a current source, the current source being operatively coupled to provide electric current through the magnetic coil; and
    an evaluating device for determining a change in the electric current through the magnetic coil and evaluating a change in forces acting on the weighing plate as a function of the determined change in current through the magnetic coil.

2. The test bed according to claim 1, further comprising a control unit operatively configured for changing the electric current flowing through the magnetic coil as a function of the forces acting on the weighing plate.

3. The test bed according to claim 1, wherein the object is a motor vehicle.

4. The test bed according to claim 1, further comprising a running belt operatively arranged with respect to the weighing plate, the running belt simulating an environment of the object.

5. The test bed according to claim 4, wherein the running belt is supported on the weighing plate, and the object is supported on the running belt.

6. The test bed according to claim 5, wherein the object is a motor vehicle.

7. A method for measuring aerodynamic forces acting on an object, the method comprising the acts of:
    supporting the object on a weighing plate of a test bed;
    utilizing at least one magnetic bearing for mounting the weighing plate relative to an environment; and
    measuring the aerodynamic forces acting on the object using the at least one magnetic bearing,
    wherein the measuring act further comprises the acts of:
        feeding an electric current through at least one magnetic coil provided of the at least one magnetic bearing;
        determining a change in the electric current upon the occurrence of aerodynamic forces; and
        converting the determined change into information concerning forces acting on the weighing plate.

8. The method according to claim 7, further comprising the acts of:
    supporting a running belt for simulating an environment of the object on the weighing plate; and
    wherein the act of supporting the object on the weighing plate is performed by supporting the object on the running belt.

9. The method according to claim 7, further comprising the acts of:
    supporting a running belt for simulating an environment of the object on the weighing plate; and
    wherein the act of supporting the object on the weighing plate is performed by supporting the object on the running belt.

10. The method according to claim 7, further comprising the act of changing the electric current fed through the at least one magnetic coil as a function of the forces acting on the weighing plate.

11. The method according to claim 10, further comprising the acts of:
    supporting a running belt for simulating an environment of the object on the weighing plate; and
    wherein the act of supporting the object on the weighing plate is performed by supporting the object on the running belt.

12. A system for performing aerodynamic measurements on a vehicle, the system comprising:
    a wind tunnel;
    a test bed operatively arranged in the wind tunnel;
    wherein the test bed comprises:
        a weighing plate operatively configured to support a weight of the vehicle;
        a bearing device on which the weighing plate is mounted relative to a stationary environment; and
        wherein the bearing device comprises at least one magnetic bearing,
        wherein the at least one magnetic bearing comprises at least one magnetic coil and a current source, the current source being operatively coupled to provide electric current through the magnetic coil.

13. The system according to claim 12, wherein a running belt is supported on the weighing plate, and the vehicle is supported on the running belt.

14. The system according to claim 12, further comprising an evaluating device for determining a change in the electric current through the magnetic coil, the evaluating device evaluating a change in forces acting on the weighing plate as a function of the determined change in current through the magnetic coil.

15. The system according to claim 14, further comprising a control unit operatively configured for changing the electric current flowing through the magnetic coil as a function of the forces acting on the weighing plate.

* * * * *